United States Patent
Hagiwara (10) Patent No.: US 11,470,255 B2
(45) Date of Patent: *Oct. 11, 2022

(54) OPTICAL MEMBER DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: NEW SHICOH MOTOR CO., LTD., Zhejiang (CN)

( * ) Notice: Subject to any disclaimer, the term of this patent is extended or adjusted under 35 U.S.C. 154(b) by 90 days.

This patent is subject to a terminal disclaimer.

(21) Appl. No.: 17/091,079

(22) Filed: Nov. 6, 2020

(65) Prior Publication Data

US 2021/0144305 A1    May 13, 2021

(30) Foreign Application Priority Data

Nov. 13, 2019    (JP) .............................. JP2019-205167

(51) Int. Cl.
*H04N 5/232*    (2006.01)
*H04N 5/225*    (2006.01)

(52) U.S. Cl.
CPC ....... *H04N 5/23287* (2013.01); *H04N 5/2253* (2013.01)

(58) Field of Classification Search
None
See application file for complete search history.

(56) References Cited

U.S. PATENT DOCUMENTS

| 7,881,598 B1 * | 2/2011 | Wu ........................ G03B 3/10 |
| | | 396/55 |
| 9,568,707 B2 * | 2/2017 | Lee ..................... G02B 27/646 |
| 11,128,788 B2 * | 9/2021 | Wade ..................... G03B 5/02 |

(Continued)

FOREIGN PATENT DOCUMENTS

| JP | 2007-37094 | 2/2007 |
| JP | 2010-145575 | 7/2010 |

(Continued)

OTHER PUBLICATIONS

English language abstract of JP 2013-050668.

(Continued)

*Primary Examiner* — Cynthia Segura
(74) *Attorney, Agent, or Firm* — Fildes & Outland, P.C.

(57) ABSTRACT

An optical member driving device, including: a sensor substrate to which an image sensor is fixed; a first slider fixed to the sensor substrate; a second slider slidable along a first direction orthogonal to an optical axis direction; and a third slider which is fixed to a lens unit which includes, and is slidable along a second direction, wherein any one of the first slider and the second slider has a first projecting member extending along the first direction, and another one of the first slider and the second slider has a first groove that is to fit over the first projecting member, and wherein any one of the second slider and the third slider has a second projecting member extending along the second direction, and another one of the second slider and the third slider has a second groove that is to fit over the second projecting member.

12 Claims, 9 Drawing Sheets

(56) References Cited

U.S. PATENT DOCUMENTS

| | | | |
|---|---|---|---|
| 2007/0025710 A1 | 2/2007 | Shin et al. | |
| 2010/0091120 A1* | 4/2010 | Nagata | H04N 5/2257 |
| | | | 359/557 |
| 2010/0149354 A1 | 6/2010 | Makimoto et al. | |
| 2012/0182436 A1* | 7/2012 | Hu | H04N 5/2254 |
| | | | 348/208.99 |
| 2016/0054578 A1* | 2/2016 | Dong | G02B 27/646 |
| | | | 359/557 |
| 2016/0139425 A1* | 5/2016 | Park | H01F 27/2804 |
| | | | 359/557 |
| 2016/0209621 A1* | 7/2016 | Park | G02B 7/08 |
| 2016/0261778 A1* | 9/2016 | Kim | H04N 5/2252 |
| 2020/0241314 A1* | 7/2020 | Takimoto | G03B 5/02 |
| 2021/0144280 A1* | 5/2021 | Hagiwara | H04N 5/2253 |

FOREIGN PATENT DOCUMENTS

| | | |
|---|---|---|
| JP | 2011 203108 | 10/2011 |
| JP | 2013-050668 | 3/2013 |
| JP | 2014-13305 | 1/2014 |

OTHER PUBLICATIONS

Office Action dated Feb. 1, 2022 in corresponding Japanese application No. 2019-205167 and English translation.
English language machine translation of JP 2014-13305.
English language machine translation of JP 2011-203408.

* cited by examiner

OPTICAL MEMBER DRIVING DEVICE, CAMERA DEVICE, AND ELECTRONIC APPARATUS

TECHNICAL FIELD

The present invention relates to an optical member driving device, a camera device, and an electronic apparatus.

BACKGROUND ART

A small-sized camera is mounted on an electronic apparatus, e.g., a mobile phone or a smart phone. As this type of small-sized camera, for example, as disclosed in Japanese Patent Application Laid-open No. 2013-50668, there is known a small-sized camera having an image stabilization function. As a technology of achieving the image stabilization function, there is known a technology called "sensor-shift". This "sensor-shift" system is of moving an image sensor in a direction orthogonal to an optical axis of a lens member (for example, Japanese Patent Application Laid-open No. 2013-50668).

However, in the above-mentioned related art, four thin hanging wires hang the image sensor so as to swing the image sensor. In this case, a sensor substrate may be unintentionally rotated, and thus precise position control has been difficult.

SUMMARY

The present invention has an object to provide an optical member driving device, a camera device, and an electronic apparatus, in which precise position control is enabled.

One aspect of the present invention is an optical member driving device. The optical member driving device includes: a sensor substrate to which an image sensor configured to detect an image of light input via the lens is fixed; a first slider fixed to the sensor substrate; a second slider configured to hold the first slider so as to be slidable along a first direction orthogonal to an optical axis direction of the lens; and a third slider which is fixed to a lens unit which includes the lens, and is configured to hold the second slider so as to be slidable along a second direction orthogonal both to the optical axis direction of the lens and the first direction. Any one of the first slider and the second slider has a first projecting member extending along the first direction, and another one of the first slider and the second slider has a first groove that is to fit over the first projecting member. Any one of the second slider and the third slider has a second projecting member extending along the second direction, and another one of the second slider and the third slider has a second groove that is to fit over the second projecting member.

Preferably, a magnet is provided on any one of the sensor substrate and the lens unit, and a coil is provided on another one of the sensor substrate and the lens unit. Through use of the magnet and the coil, the lens unit or the sensor substrate is driven in the direction orthogonal to the optical axis direction of the lens.

In order to decrease the height of the optical member driving device in the optical axis direction, the first slider may be formed into a quadrangular frame shape and have a first accommodation part that is formed by cutting out a side portion of the first slider inward, and a first corner portion that is formed at a corner portion of the first slider, and one of the magnet and the coil may be accommodated in the first accommodation part. Further, the third slider may be formed into a quadrangular frame shape and have a third accommodation part that is formed by cutting out a side portion of the third slider inward, and a third corner portion that is formed at a corner portion of the third slider, and another one of the magnet and the coil may be accommodated in the third accommodation part. Further, the second slider may be formed into a quadrangular frame shape and have a second accommodation part that is formed by cutting out a side portion of the second slider inward, and a second corner portion that is formed at a corner portion of the second slider, and a part of at least one of the magnet and the coil may be accommodated in the second accommodation part.

Further, in order to ensure drive stability, the first projecting member, the first groove, the second projecting member, and the second groove may be arranged in the first corner portion, the second corner portion, or the third corner portion.

It is preferred that the second accommodation part have an end surface separated away from the magnet accommodated in the second accommodation part by a distance equal to or larger than a distance by which the second slider slides so that a sliding width of the second slider is secured.

Further, a magnetic member may be provided on the another one of the sensor substrate and the lens unit across the coil so that movement between the sensor substrate and the lens unit in the optical axis direction of the lens is restricted.

Another aspect of the present invention is a camera device including the optical member driving device. Further, yet another aspect of the present invention is an electronic apparatus including the camera device.

According to at least one embodiment of the present invention, the first slider, the second slider, and the third slider are provided. The first projecting member extending along the first direction is formed on any one of the first slider and the second slider, and the first groove to be fitted to the first projecting member is formed in the another one of the first slider and the second slider. Further, the second projecting member extending along the second direction is formed on any one of the second slider and the third slider, and the second groove to be fitted to the second projecting member is formed in the another one of the second slider and the third slider. In this manner, deviation of the sensor substrate with respect to the lens unit can be reduced, and precise position control is enabled.

DETAILED DESCRIPTION OF THE EMBODIMENTS

An embodiment of the present invention will be described hereinafter with reference to the drawings.

FIG. 1 to FIG. 5 show a camera device 10 according to the embodiment of the present invention. FIG. 6 to FIG. 9 show a sensor driving unit 14 serving as an optical member driving device used in the camera device 10 according to the embodiment of the present invention.

As illustrated in FIG. 1 to FIG. 5, the camera device 10 includes a lens unit 12 and the sensor driving unit 14. The lens unit 12 includes a lens 16 provided inside a casing 18. This lens unit 12 is fixed to a main body of a camera device (not shown). The casing 18 is formed into a quadrangular shape as viewed from an optical axis direction of the lens 16. At the center of the casing 18, opening portions 20 and 22 having circular shapes as viewed from the optical axis direction of the lens 16 are formed at an upper portion and a lower portion of the lens 16. The opening portions 20 and 22 are formed to allow light to pass through the lens 16, or to mount and remove the lens 16 into and from the casing 18.

The lens 16 may be fixed to the casing 18. However, in this embodiment, the lens unit 12 is configured such that the lens 16 is supported so as to be freely movable relative to the casing 18 in the optical axis direction of the lens 16, and the lens unit 12 includes a driving mechanism configured to drive the lens 16. That is, the lens unit 12 has a well-known autofocus function, and is configured as follows. A lens support that supports the lens 16 is supported by the casing 18 via, for example, springs. Any one of the lens support and the casing 18 is provided with magnets, and another one thereof is provided with coils. The coils are energized so that the lens support is moved in the optical axis direction of the lens 16.

For the sake of convenience, the optical axis direction of the lens 16 is herein referred to as "Z direction", a direction orthogonal to the optical axis direction is referred to as "X direction", and a direction orthogonal both to the Z direction and the X direction is referred to as "Y direction". Further, an object side of an optical axis is referred to as "upper side", and the opposite side which is opposite to the upper side and an image sensor described later is arranged is referred to as "lower side".

The sensor driving unit 14 includes a first slider 24, a second slider 26, a third slider 28, and a sensor substrate 30 each having substantially the same size as the lens unit 12 when viewing from the Z direction. The first slider 24, the second slider 26, and the third slider 28 are formed into a quadrangular frame shape. The sensor substrate 30 is formed into a quadrangular plate shape.

The first slider 24 is fixed to the sensor substrate 30. This first slider 24 has, at its center, a first light passing hole 32 formed as a substantially quadrangular shape. First accommodation parts 34 are respectively formed in the four sides of the first slider 24. The first accommodation parts 34 are formed by being cut out into a quadrangular groove shape inward in X-Y directions, with four first corner portions 36 being left uncut. Coils 38 are accommodated in the first accommodation parts 34, respectively.

The sensor substrate 30 has, for example, a quadrangular image sensor 40 fixed at a center of an upper surface of the sensor substrate 30. Further, the coils 38 are fixed on the upper surface of the sensor substrate 30 around the image sensor 40 and in the vicinity of the four sides of the sensor substrate 30. Each of the coils 38 includes two linear parts extending along the X direction or the Y direction, and semicircular connecting parts each connecting between those two linear parts. A longitudinal distance of the first accommodation part 34 between one end to another end is substantially equal to the overall longitudinal length of linear parts of the coil 38. A cut-out length (cut-out depth from each side) at each side end of the first accommodation part 34 is equal to or slightly larger than the overall width in the semicircular connecting parts of the coil 38. Further, a Z-direction thickness of the coil 38 is substantially equal to a Z-direction thickness of the first slider 24.

Figure 1:
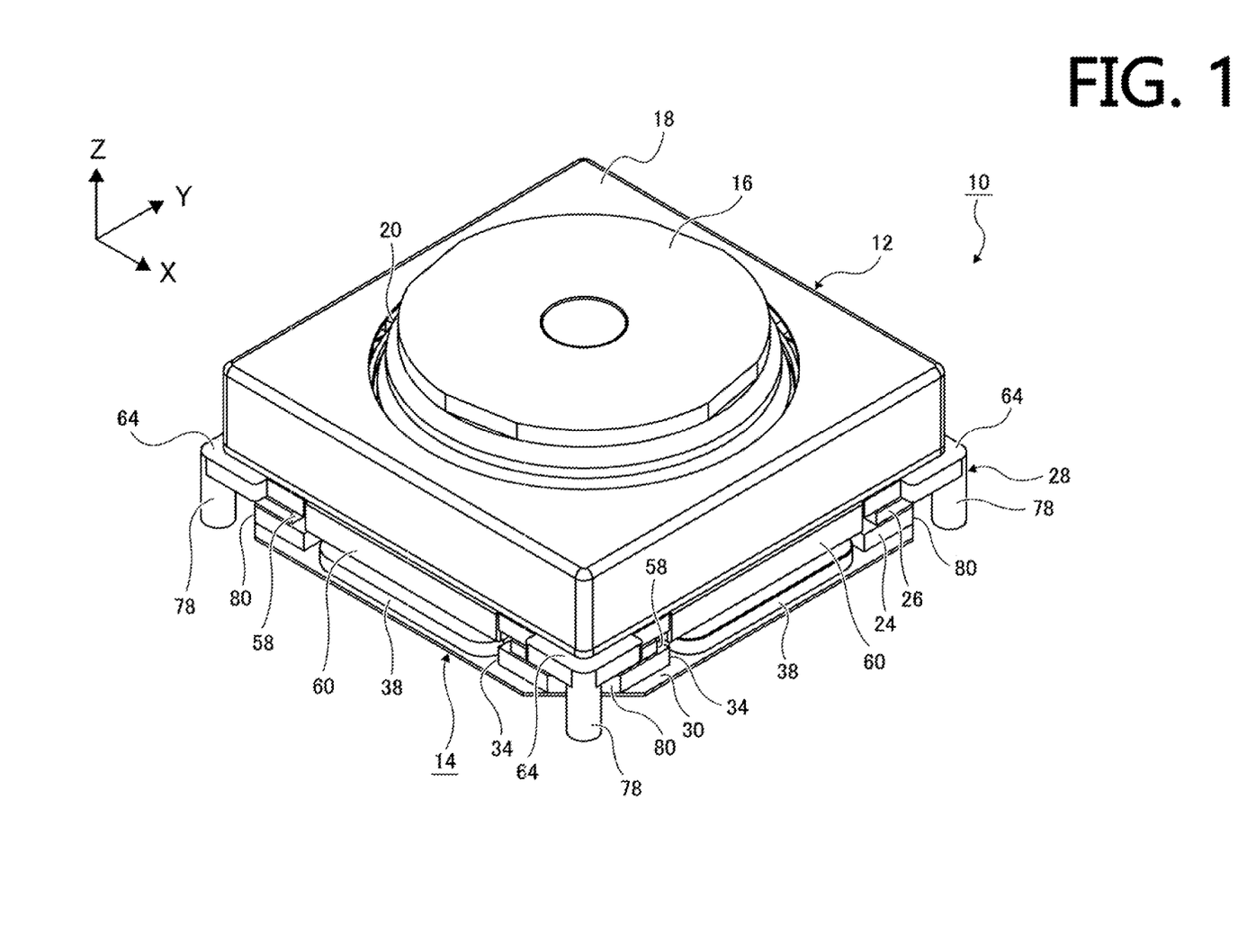
FIG. 1 is a perspective view for illustrating a camera device according to an embodiment of the present invention as viewed obliquely from above.
Figure 2:
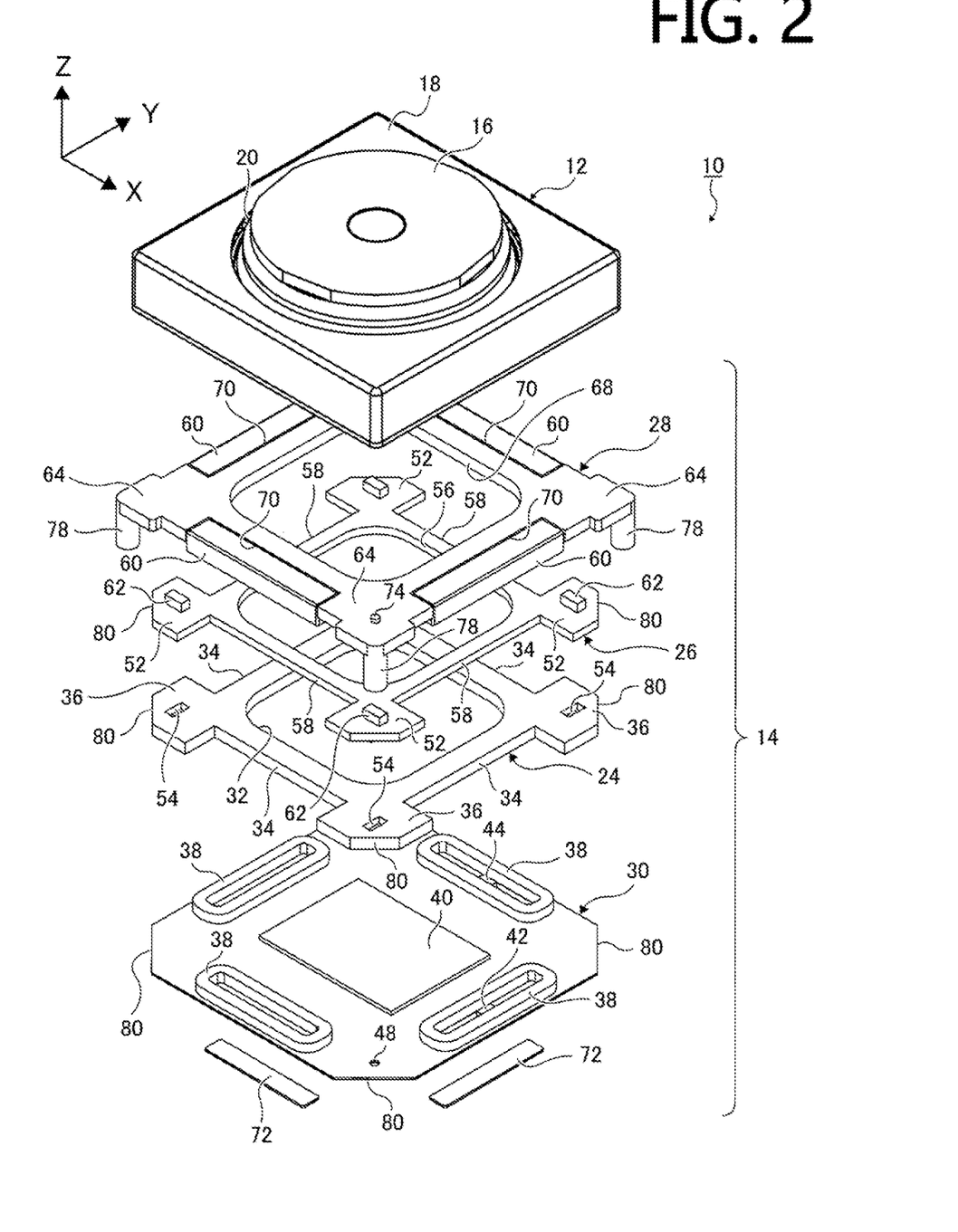
FIG. 2 is an exploded perspective view for illustrating the camera device according to the embodiment of the present invention as viewed obliquely from above.
Figure 7:
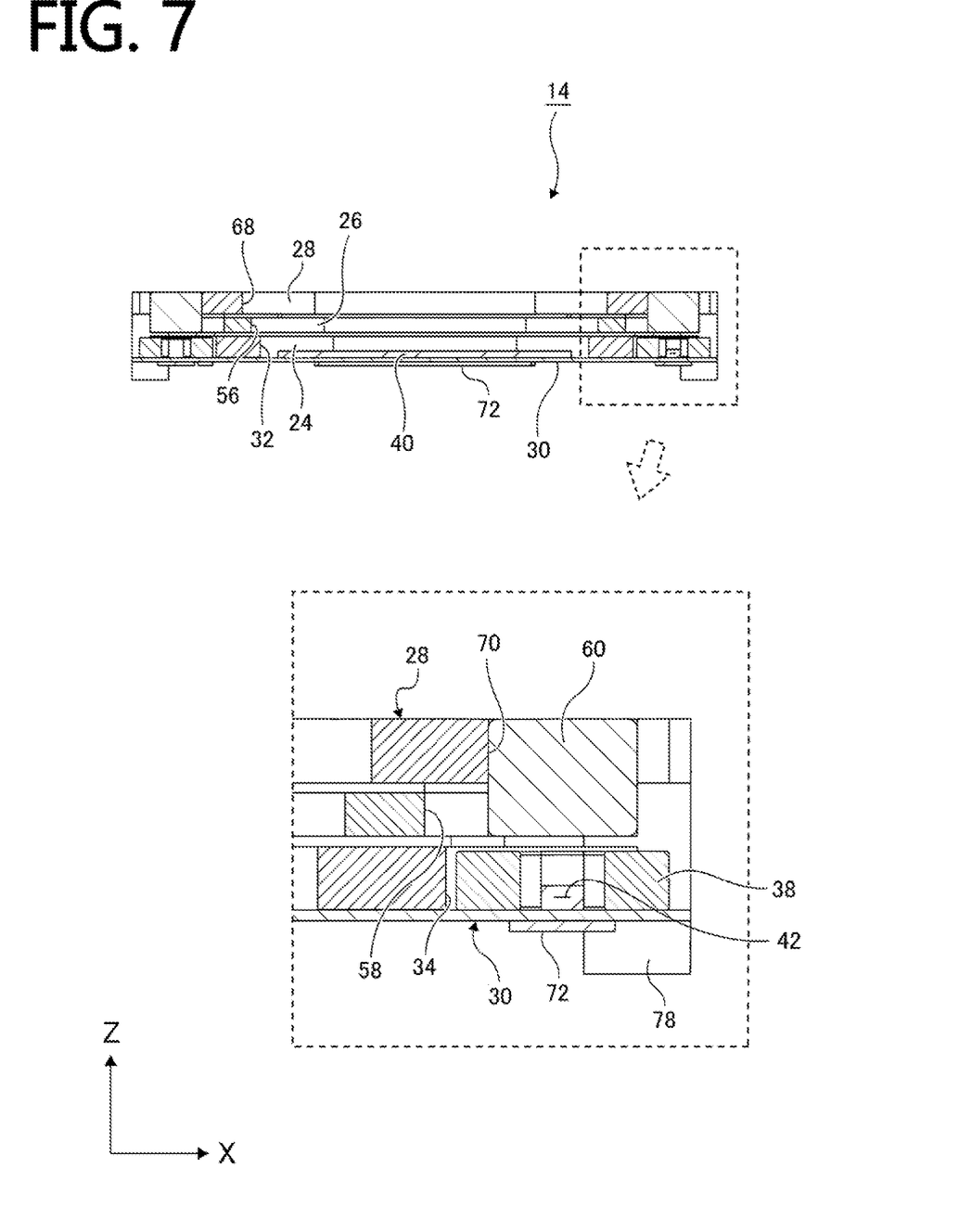
FIG. 7 is a sectional view taken along the line A-A of FIG. 6 and a partially-enlarged sectional view for illustrating the sensor driving unit used in the camera device according to the embodiment of the present invention.
Figure 8:
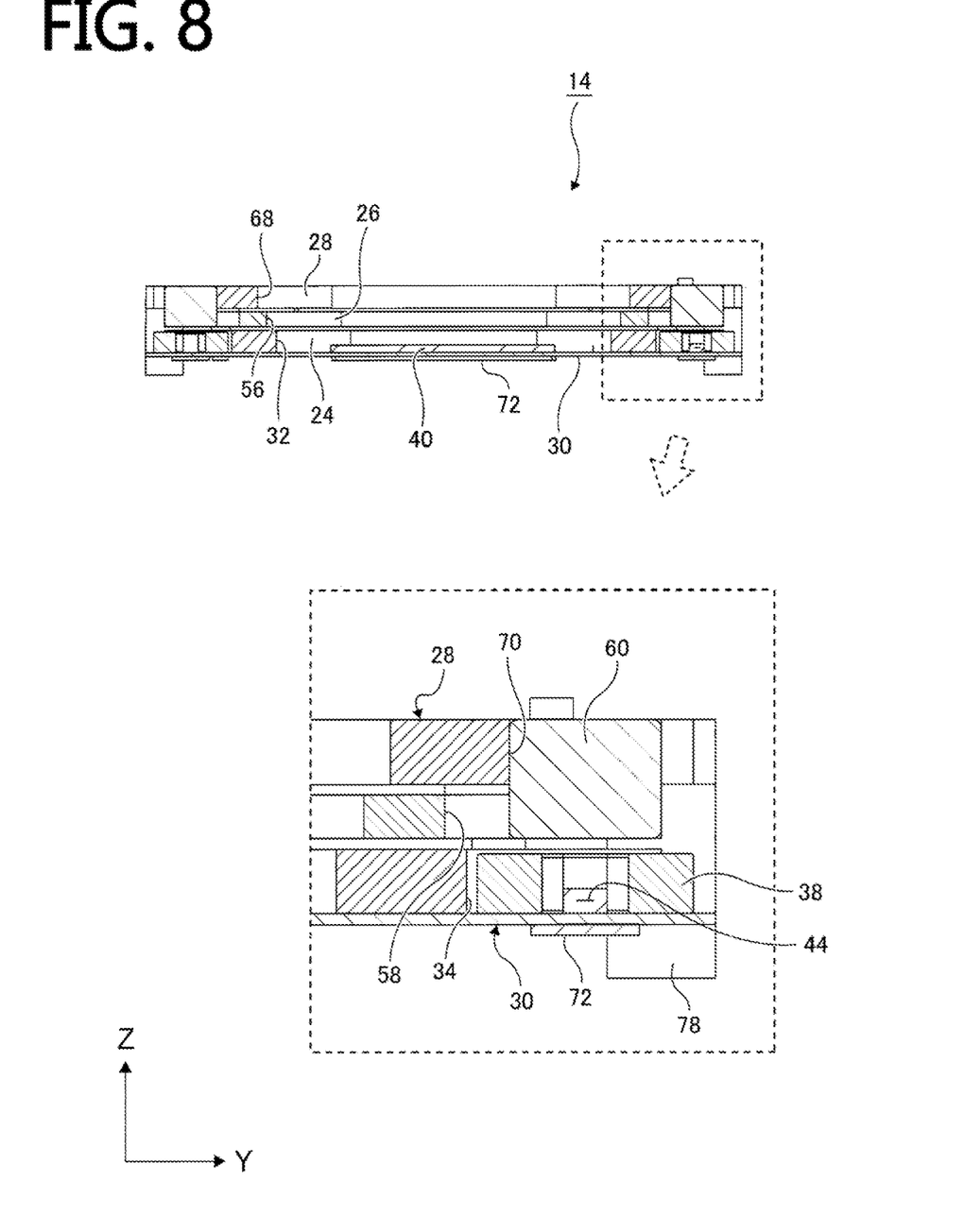
FIG. 8 is a sectional view taken along the line B-B of FIG. 6 and a partially-enlarged sectional view for illustrating the sensor driving unit used in the camera device according to the embodiment of the present invention.
Figure 9:
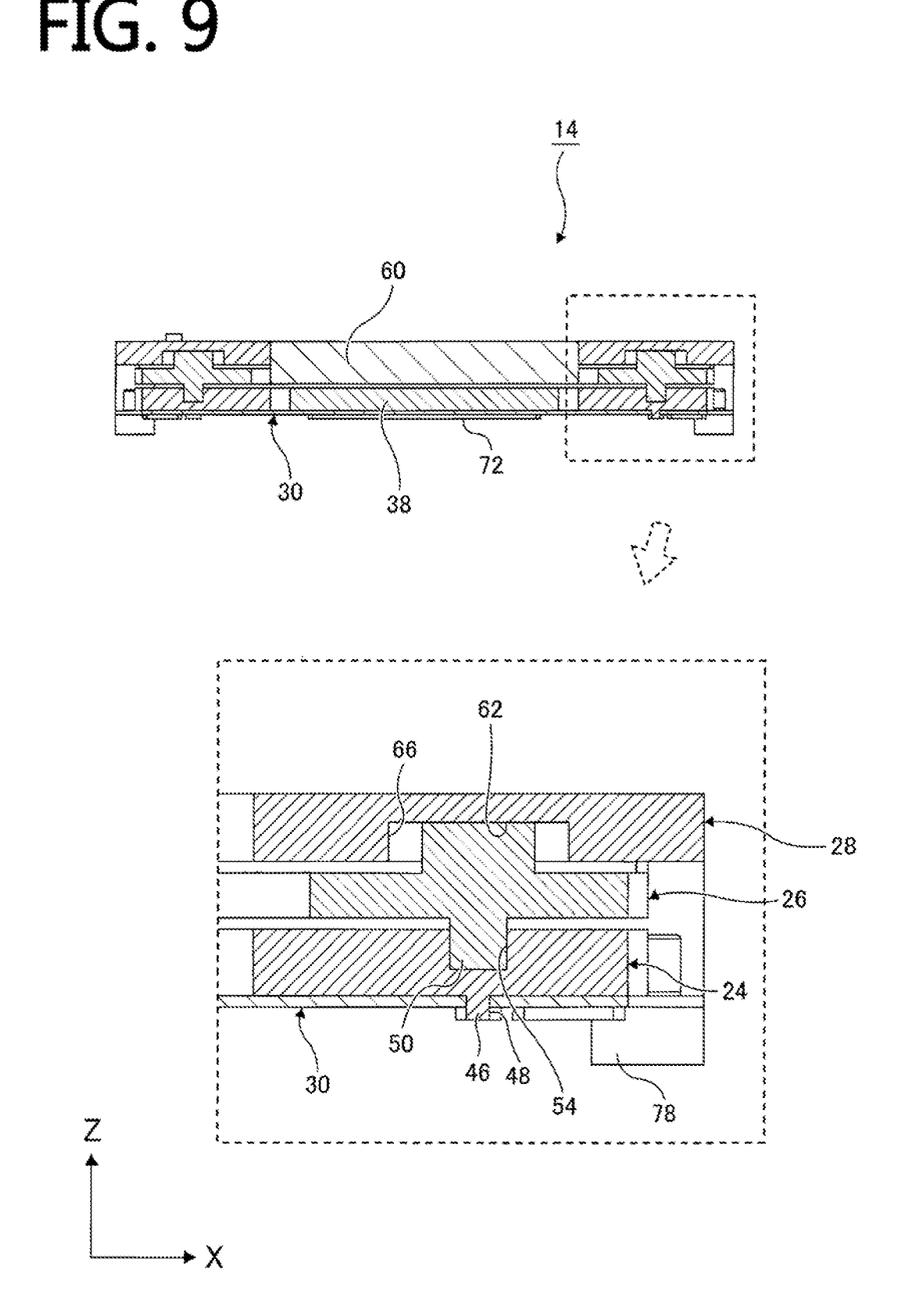
FIG. 9 is a sectional view taken along the line C-C of FIG. 6 and a partially-enlarged sectional view for illustrating the sensor driving unit used in the camera device according to the embodiment of the present invention.

Further, as illustrated in FIG. 2, FIG. 7, and FIG. 9, an X-direction position detector 42 configured to detect an X-direction position of the sensor substrate 30 is provided inside one coil 38 arranged in the X direction. Further, a Y-direction position detector 44 configured to detect a Y-direction position of the sensor substrate 30 is provided inside one coil 38 arranged in the Y direction.

Figure 3:
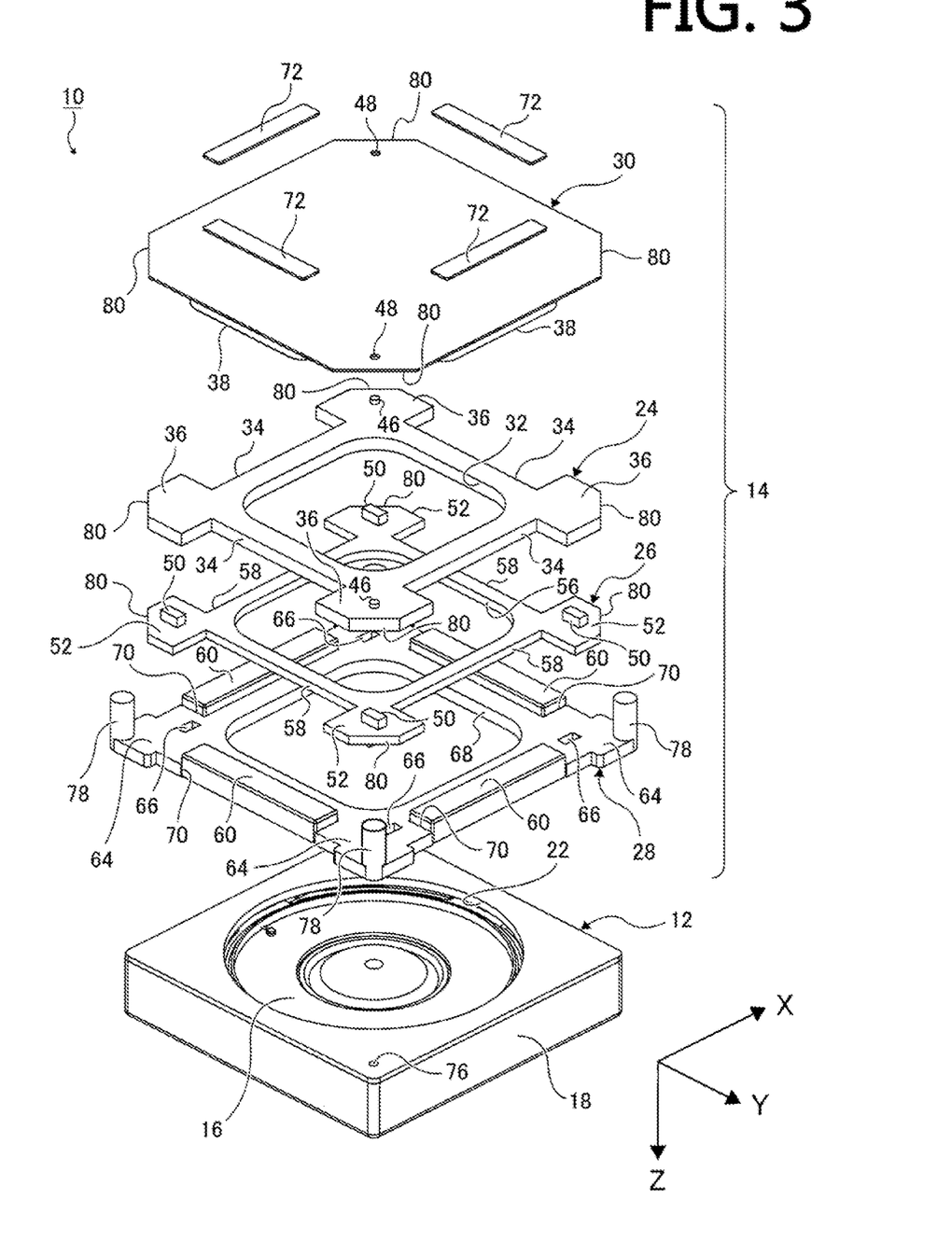
FIG. 3 is an exploded perspective view for illustrating the camera device according to the embodiment of the present invention as viewed obliquely from below.
Figure 4:
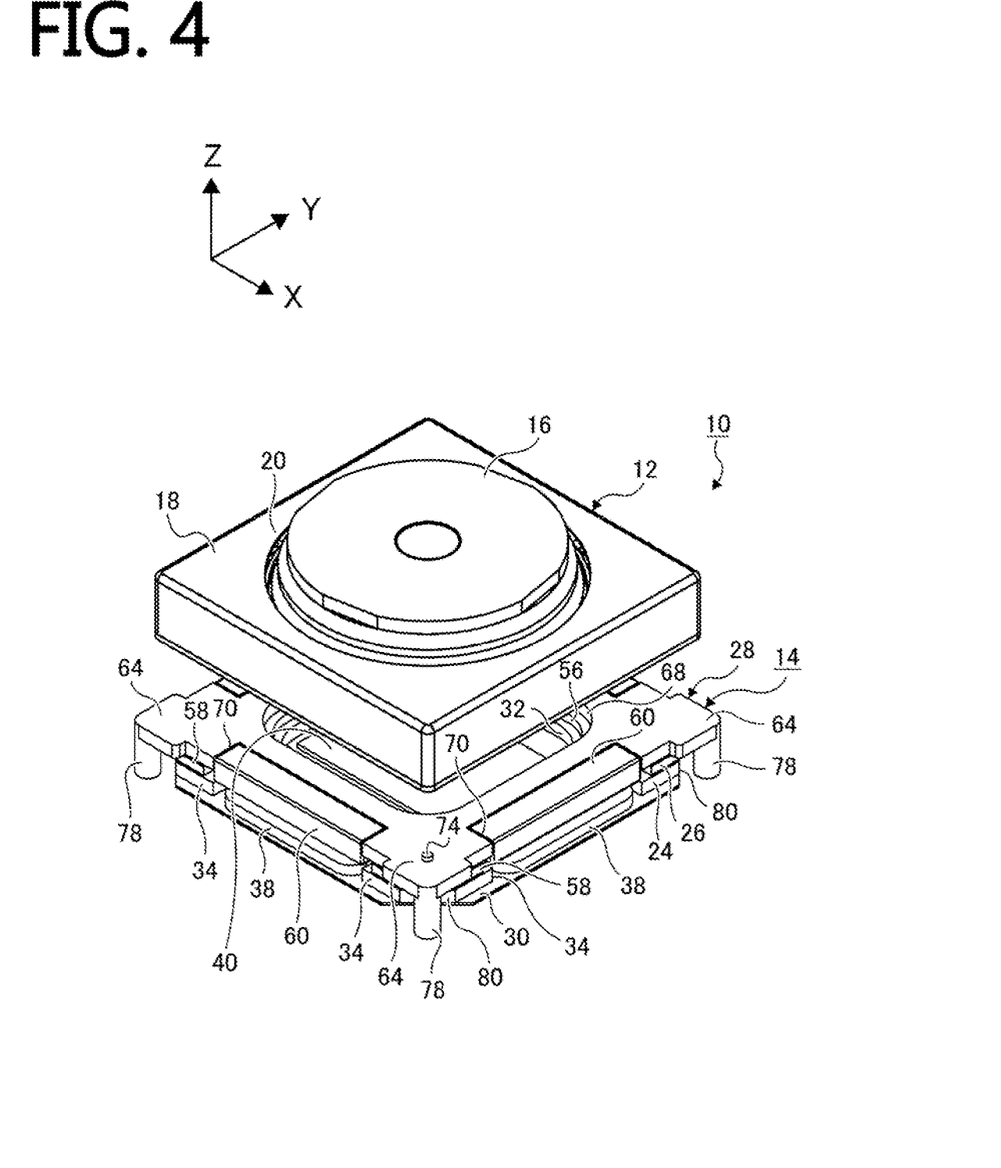
FIG. 4 is a perspective view for illustrating the camera device according to the embodiment of the present invention, and for illustrating a lens unit and a sensor driving unit as viewed obliquely from above.
Figure 5:
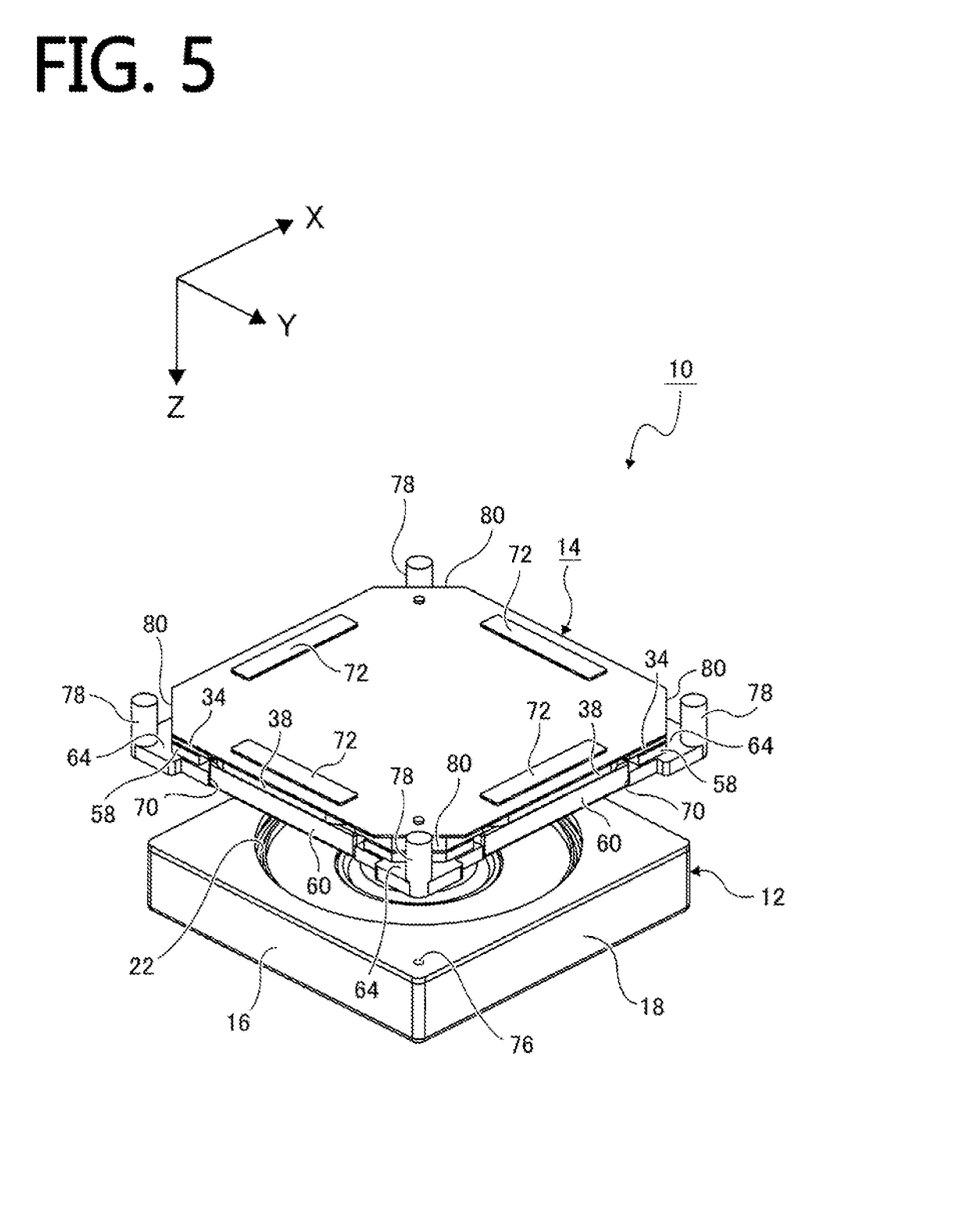
FIG. 5 is a perspective view for illustrating the camera device according to the embodiment of the present invention, and for illustrating the lens unit and the sensor driving unit as viewed obliquely from below.
Figure 6:
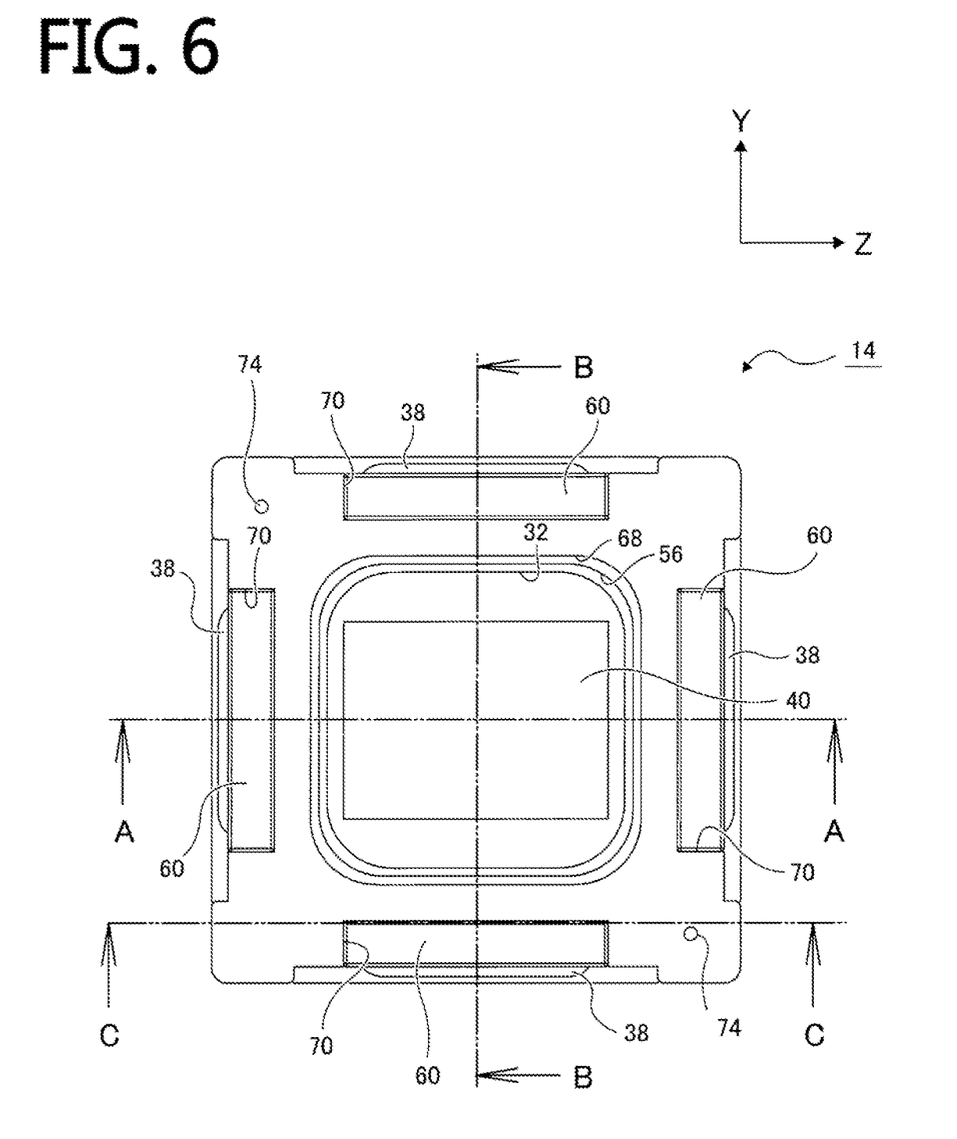
FIG. 6 is a plan view for illustrating the sensor driving unit used in the camera device according to the embodiment of the present invention.

Further, first positioning protrusions 46 and 46 protruding downward are formed on lower surfaces of two first corner portions 36 and 36 arranged on an imaginal diagonal line of the first slider 24 (see FIG. 3). Meanwhile, the sensor substrate 30 has first positioning holes 48 and 48 formed so as to correspond to the first positioning protrusions 46 and 46, respectively (see FIG. 3). The first positioning protrusions 46 and 46 are inserted into the first positioning holes 48 and 48, respectively, so that the first slider 24 is positioned and fixed to the sensor substrate 30.

The second slider 26 holds the first slider 24 so as to be slidable in the Y direction. That is, first projecting members 50 extending along the Y direction are respectively formed on lower surfaces of four second corner portions 52 of the second slider 26 (see FIG. 3), and first grooves 54 extending along the Y direction are respectively formed in upper surfaces of the four first corner portions 36 of the first slider 24 (see FIG. 2). The first projecting members 50 are fitted into the first grooves 54 so as to be movable only along the Y direction. The first projecting member 50 and the first groove 54 have substantially the same widths in the X-direction. Further, a longitudinal length of the first projecting member 50 along the Y-direction is smaller than a longitudinal length of the first groove 54 along the Y-direction. Thus, the second slider 26 is allowed to move only along the Y direction relative to the first slider 24.

The second slider 26 has, at its center, a second light passing hole 56 formed as a substantially quadrangular shape, which is formed so as to correspond to the first light passing hole 32. Second accommodation parts 58 are respectively formed in the four sides of the second slider 26. The second accommodation parts 58 are formed by being cut out into a quadrangular grove shape inward in the X-Y directions, with the four second corner portions 52 being left uncut. Substantially a lower half of a magnet 60 described later is accommodated in each second accommodation part 58. Further, a distance between an end surface of the second accommodation part 58 and the magnet 60 is kept to be equal to or larger than a distance by which the second slider 26 slides.

The third slider 28 holds the second slider 26 so as to be slidable in the X direction. That is, second projecting members 62 extending along the X direction are respectively formed on upper surfaces of the four second corner portions 52 of the second slider 26 (see FIG. 2), and second grooves 66 extending along the X direction are respectively formed in lower surfaces of four third corner portions 64 of the third slider 28 (see FIG. 3). The second projecting members 62 are fitted into the second grooves 66 so as to be movable only along the X direction. The second projecting member 62 and the second groove 66 have substantially the same widths in the Y-direction. Further, the longitudinal length of the second projecting member 62 along the X-direction is smaller than the longitudinal length of the second groove 66 along the X-direction. Thus, the second slider 26 is allowed to move only along the X direction relative to the third slider 26 (see FIG. 9).

The third slider 28 has, at its center, a third light passing hole 68 formed as a substantially quadrangular shape, which is formed so as to correspond to the first light passing hole 32 and the second light passing hole 56. Third accommodation parts 70 are respectively formed in the four sides of the third slider 28. The third accommodation parts 70 are formed by being cut out into a quadrangular groove shape inward in the X-Y directions, with the four third corner portions 64 being left uncut. Substantially an upper half of the magnet 60 is fitted and fixed in each of the third accommodation parts 70.

The magnet 60 is fixed to a lower surface of the lens unit 12 and an inner surface of the third accommodation part 70 of the third slider 28. The magnet 60 is magnetized in a surface opposed to the coil 38 so that, for example, an inner half thereof has the N pole and an outer half thereof has the S pole. The inner N pole is opposed to the inner linear part of the coil 38, and the outer S pole is opposed to the outer linear part of the coil 38. Further, each of the X-direction position detector 42 and the Y-direction position detector 44 is formed of, for example, a Hall element, and is arranged inside the coil 38. When the detectors are moved relative to the magnets 60, magnetic flux densities are changed, and thus the detectors detect relative positions with respect to the magnets 60, that is, the position of the image sensor 40.

Further, magnetic members 72 are fixed to a lower surface of the sensor substrate 30 so as to be opposed to the magnets 60 across the coils 38. The magnets 60 and the magnetic members 72 attract each other by magnetic forces so that the sensor substrate 30 is attracted to the third slider 28 in the Z direction.

Further, second positioning protrusions 74 and 74 protruding upward are formed on upper surfaces of two the third corner portions 64 and 64 arranged on an imaginal diagonal line of the third slider 28 (see FIG. 2). Meanwhile, a lower surface of the casing 18 of the lens unit 12 has second positioning holes 76 and 76 formed so as to correspond to the second positioning protrusions 74 and 74, respectively (see FIG. 3). The second positioning protrusions 74 and 74 are inserted into the second positioning holes 76 and 76, respectively, so that the third slider 28 is positioned and fixed to the casing 18 of the lens unit 12.

Further, columnar stoppers 78 that protrude downward are formed on the four third corner portions 64 of the third slider 28. Meanwhile, parts of the first slider 24, the second slider 26, and the sensor substrate 30 at respective four corner portions are cut out at 45 degrees to form stopper receiving portions 80. When the sensor substrate 30 is moved in the X-Y directions relative to the lens unit 12, the stoppers 78 abut the stopper receiving portions 80 to restrict further movement.

In the above-mentioned configuration, with energization to the coils 38 and 38 opposed to the magnets 60 and 60 both of which have two magnetic poles in the X direction in which magnetic fluxes in the Z direction are interposed, currents flow through the coils 38 and 38 along the Y direction, and a Lorentz force toward the X direction acts on the coils 38 and 38 according to the Fleming's left hand rule. The sensor substrate 30 is held with respect to the lens unit 12 via the second projecting members 62 and the second grooves 66 so as to be slidable along the X direction, and hence the sensor substrate 30 is moved in the X direction by the Lorentz force acting on the coils 38 and 38. The position of the sensor substrate 30 after being moved in the X direction is detected by the X-direction position detector 42.

Further, with the energization to the coils 38 and 38 opposed to the magnets 60 and 60 both of which have two magnetic poles in the Y direction in which the magnetic fluxes in the Z direction are interposed, currents flow through the coils 38 and 38 along the X direction, and the Lorentz force toward the Y direction acts on the coils 38 and 38 according to the Fleming's left hand rule. The sensor substrate 30 is held with respect to the lens unit 12 via the first projecting members 50 and the first grooves 54 so as to be slidable along the Y direction, and hence the sensor substrate 30 is moved in the Y direction by the Lorentz force acting on the coils 38 and 38. The position of the sensor substrate 30 after being moved in the Y direction is detected by the Y-direction position detector 44.

In this manner, the image sensor 40 can be moved in the X-Y directions, and thus image stabilization can be achieved. In this case, the movement of the sensor substrate 30 is restricted by the first projecting members 50 and the first grooves 54, and the second projecting members 62 and the second grooves 66 extending along the X-Y directions. Thus, rotation thereof about the Z axis is suppressed. Therefore, deviation of the sensor substrate 30 with respect to the lens unit 12 is small, and thus precise position control is enabled.

In the above-mentioned embodiment, the lens unit 12 is fixed while the sensor substrate 30 is moved in the X-Y directions, however, conversely, the sensor substrate 30 may be fixed while and the lens unit 12 may be moved in the X-Y directions. Further, the first projecting members 50 and the first grooves 54, and the second projecting members 62 and the second grooves 66 may be replaced with each other in terms of the projecting and recessed shapes. Further, the extending direction of the first projecting members 50 and the first grooves 54 and the extending direction of the second projecting members 62 and the second grooves 66 may be replaced with each other. Further, the positions of the magnets 60 and the coils 38 may be replaced with each other, including the magnetic members 72.

Further, each of the second accommodation parts 58 may accommodate both of the coil 38 and the magnet 60, or may accommodate only the coil 38. In this case, the smaller one of the distance between the end surface of the second accommodation part 58 and the magnet 60 and the distance between the end surface of the second accommodation part 58 and the coil 38 is ensured to be equal to or larger than the distance by which the second slider 26 slides. Further, when neither of the coil 38 nor the magnet 60 is accommodated in the second accommodation part 58, the second accommodation part 58 is not required to be formed.

What is claimed is:

1. An optical member driving device, comprising:
    a sensor substrate to which an image sensor configured to detect an image of light input via the lens is fixed;
    a first slider fixed to the sensor substrate;
    a second slider configured to hold the first slider so as to be slidable along a first direction orthogonal to an optical axis direction of the lens; and
    a third slider which is fixed to a lens unit which includes the lens, and is configured to hold the second slider so as to be slidable along a second direction orthogonal both to the optical axis direction of the lens and the first direction,
    wherein any one of the first slider and the second slider has a first projecting member extending along the first direction, and another one of the first slider and the second slider has a first groove that is to fit over the first projecting member, and
    wherein any one of the second slider and the third slider has a second projecting member extending along the second direction, and another one of the second slider and the third slider has a second groove that is to fit over the second projecting member.

2. The optical member driving device according to claim 1, further comprising:
    a magnet provided on any one of the sensor substrate and the lens unit; and
    a coil provided on another one of the sensor substrate and the lens unit.

3. The optical member driving device according to claim 2,
    wherein the first slider is formed into a quadrangular frame shape,
    wherein the first slider has a first accommodation part that is formed by cutting out a side portion of the first slider inward, and a first corner portion that is formed at a corner portion of the first slider, and
    wherein one of the magnet and the coil is accommodated in the first accommodation part.

4. The optical member driving device according to claim 3, wherein one of the first projecting member and the first groove is arranged in the first corner portion.

5. The optical member driving device according to claim 2,
    wherein the third slider is formed into a quadrangular frame shape,
    wherein the third slider has a third accommodation part that is formed by cutting out a side portion of the third slider inward, and a third corner portion that is formed at a corner portion of the third slider, and
    wherein another one of the magnet and the coil is accommodated in the third accommodation part.

6. The optical member driving device according to claim 5, wherein one of the second projecting member and the second groove is arranged in the third corner portion.

7. The optical member driving device according to claim 2,
    wherein the second slider is formed into a quadrangular frame shape,
    wherein the second slider has a second accommodation part that is formed by cutting out a side portion of the second slider inward, and a second corner portion that is formed at a corner portion of the second slider, and
    wherein a part of at least one of the magnet and the coil is accommodated in the second accommodation part.

8. The optical member driving device according to claim 7, wherein the second accommodation part has an end surface separated away from the coil and the magnet accommodated in the second accommodation part by a distance equal to or larger than a distance by which the second slider slides.

9. The optical member driving device according to claim 7, wherein another one of the first projecting member and the first groove, and another one of the second projecting member and the second groove are arranged in the second corner portion.

10. The optical member driving device according to claim 2, further comprising a magnetic member provided on the another one of the sensor substrate and the lens unit across the coil.

11. A camera device, comprising the optical member driving device including:
    a lens unit including a lens;
    a sensor substrate to which an image sensor configured to detect an image of light input via the lens is fixed;
    a first slider fixed to the sensor substrate;
    a second slider configured to hold the first slider so as to be slidable along a first direction orthogonal to an optical axis direction of the lens; and
    a third slider which is fixed to the lens unit, and is configured to hold the second slider so as to be slidable along a second direction orthogonal both to the optical axis direction of the lens and the first direction,
    wherein any one of the first slider and the second slider has a first projecting member extending along the first direction, and another one of the first slider and the second slider has a first groove that is to fit over the first projecting member, and
    wherein any one of the second slider and the third slider has a second projecting member extending along the second direction, and another one of the second slider and the third slider has a second groove that is to fit over the second projecting member.

12. An electronic apparatus, comprising the camera device optical member that has a driving device including:
    a lens unit including a lens;
    a sensor substrate to which an image sensor configured to detect an image of light input via the lens is fixed;
    a first slider fixed to the sensor substrate;
    a second slider configured to hold the first slider so as to be slidable along a first direction orthogonal to an optical axis direction of the lens; and
    a third slider which is fixed to the lens unit, and is configured to hold the second slider so as to be slidable along a second direction orthogonal both to the optical axis direction of the lens and the first direction,
    wherein any one of the first slider and the second slider has a first projecting member extending along the first direction, and another one of the first slider and the second slider has a first groove that is to fit over the first projecting member, and
    wherein any one of the second slider and the third slider has a second projecting member extending along the second direction, and another one of the second slider and the third slider has a second groove that is to fit over the second projecting member.

\* \* \* \* \*